(12) United States Patent
Anderson et al.

(10) Patent No.: US 11,045,972 B2
(45) Date of Patent: Jun. 29, 2021

(54) FLAIL CHAIN LINK WITH INTERLOCKING LINK CONFIGURATION

(71) Applicant: Astec Industries, Inc., Chattanooga, TN (US)

(72) Inventors: Nathan Anderson, Eugene, OR (US); Arnold Neil Peterson, Eugene, OR (US)

(73) Assignee: Astee Industries, Inc., Chattanooga, TN (US)

( * ) Notice: Subject to any disclaimer, the term of this patent is extended or adjusted under 35 U.S.C. 154(b) by 99 days.

(21) Appl. No.: 16/380,118

(22) Filed: Apr. 10, 2019

(65) Prior Publication Data

US 2019/0232521 A1 Aug. 1, 2019

Related U.S. Application Data

(63) Continuation-in-part of application No. 15/468,327, filed on Mar. 24, 2017, now abandoned.

(60) Provisional application No. 62/449,166, filed on Jan. 23, 2017.

(51) Int. Cl.
  *B27L 1/12* (2006.01)
  *F16G 13/18* (2006.01)
  *B27L 11/02* (2006.01)

(52) U.S. Cl.
  CPC .............. *B27L 1/122* (2013.01); *F16G 13/18* (2013.01); *B27L 11/02* (2013.01)

(58) Field of Classification Search
  CPC .. B27L 1/12; B27L 1/122; B27L 1/125; B27L 1/127
  See application file for complete search history.

(56) References Cited

U.S. PATENT DOCUMENTS

| | | | | |
|---|---|---|---|---|
| 5,293,916 A | * | 3/1994 | Kucherry, Sr. | ...... A01G 23/097 144/208.7 |
| 7,878,227 B2 | * | 2/2011 | Jensen | ................. A01G 23/097 144/208.7 |
| 2010/0212782 A1 | * | 8/2010 | Huangfu | ................. B27L 1/122 144/208.7 |

* cited by examiner

*Primary Examiner* — Matthew Katcoff
(74) *Attorney, Agent, or Firm* — Chambliss, Bahner & Stophel, P.C.; Stephen D. Adams

(57) ABSTRACT

A flail chain link comprises a plurality of adjacent link sections including a pair of oppositely disposed end link sections. Each end link section has an internal surface, and a first axis passes through the center point of the link and the center of each end link section. A second axis, which is not coincident with the first axis, passes through the center point and the center of at least two link sections. The first axis and the second axis together define a central plane through the center of each link section. An orthogonal plane passing through each of the end link sections is perpendicular to the central plane. A radius of the internal surface of each end link section that is measured in the central plane is equal to a radius of the internal surface of such end link section that is measured in the orthogonal plane.

9 Claims, 4 Drawing Sheets

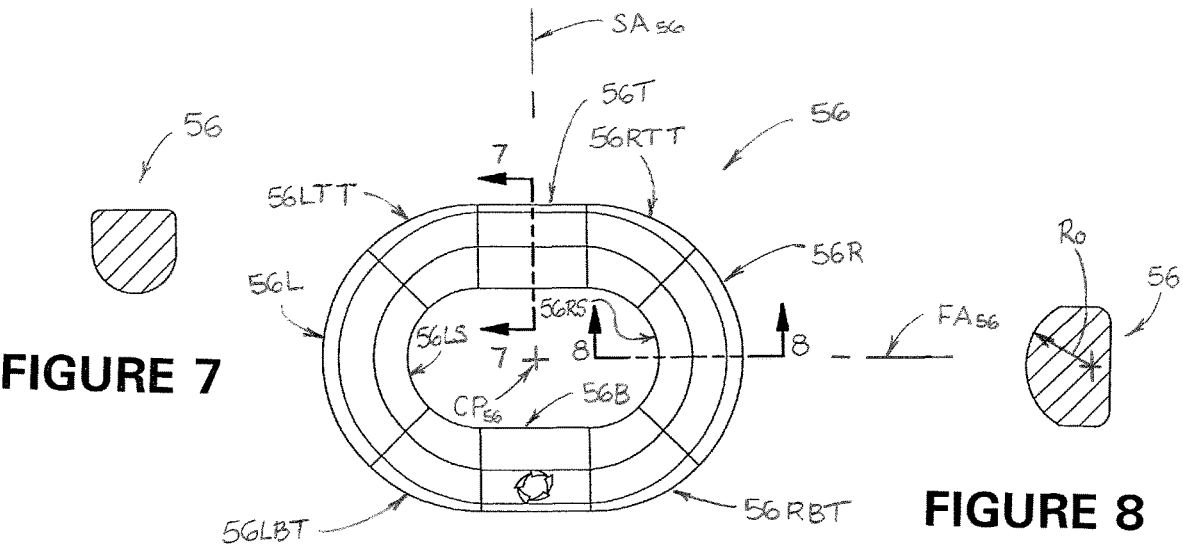
FIGURE 7
FIGURE 6
FIGURE 8
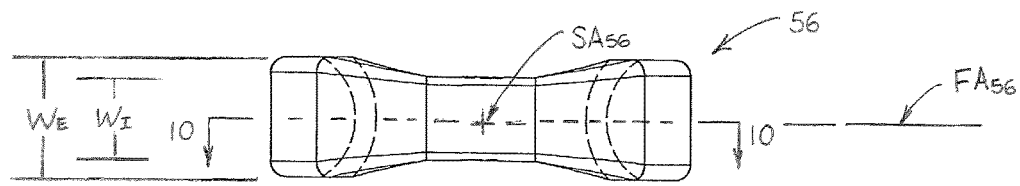
FIGURE 9
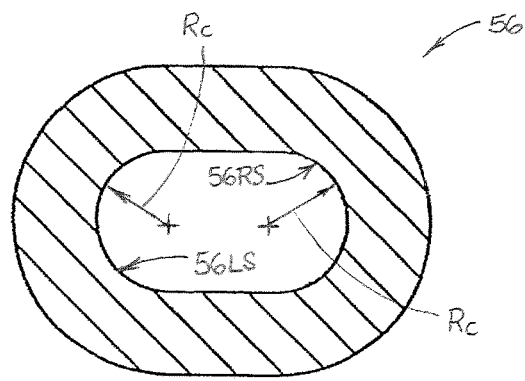
FIGURE 10

FLAIL CHAIN LINK WITH INTERLOCKING LINK CONFIGURATION

CROSS-REFERENCE TO RELATED APPLICATION

This application claims the benefit of co-pending U.S. patent application Ser. No. 15/468,327, which was filed on Mar. 24, 2017 and claims the benefit of U.S. Provisional Patent Application No. 62/449,166, which was filed on Jan. 23, 2017.

FIELD OF THE INVENTION

The present invention relates generally to devices and methods for removing the bark and small limbs from logs, and more particularly, to a flail chain for a flail assembly of a debarking machine. The chain links of the flail chain have an interlocking configuration that reduces wear on the chain as it is used in a flail assembly.

BACKGROUND OF THE INVENTION

In processing logs for various purposes, it is usually necessary to first remove the bark and limbs from the logs. Debarking machines are known for this purpose, and frequently include flail assemblies comprising two or more rotating flail shafts to which are attached multiple flail chains. If the logs are intended to be processed into chips, it is common for a debarking machine to be located adjacent to, to be attached to, or to be combined with a log chipping machine. Furthermore, it is desirable to completely remove all bark prior to the chipping process, because bark is considered to be a contaminant in the chips.

In a debarking machine, logs are introduced into the rotating flail chains in a direction normal to the axis of rotation of the flail shaft. Typically, a plurality of flail shafts are arranged in a debarking machine so that at least one is an upper flail shaft and another is a lower flail shaft, although they may be laterally offset from each other. In such a machine, the processing direction along which the logs are passed through the machine is located between an upper flail shaft and a lower flail shaft. In order to remove the bark and limbs from the log, it is preferable that at least some of the flail chains on the upper flail shaft reach down along the sides of the log to at least the mid-point. Similarly, it is also preferred that at least some of the flail chains on the lower flail shaft reach upwardly along the sides of the log to approximately the mid-point. Flail chains may be approximately sixteen inches long or longer, and are mounted close together. During the debarking operation, the flail chains are subjected to significant stresses.

FIG. 1 illustrates a portion of a conventional debarking machine 20 which includes upper flail assembly 22 and lower flail assembly 24. Each flail assembly includes a rotatable flail shaft comprising axle 26 to which a drum 28 is mounted. A plurality of conventional flail chains 30, each of which has an attachment end 32 and a free end 34, are operatively attached at the attachment end to the drum of each flail shaft, and the flail shafts are rotated so that the flail chains contact a log, such as log 36, that is moving in processing direction "P" through the flail assemblies. Upper flail assembly 22 includes pivot arm 38 that is mounted to machine 20 so as to pivot about pivot axis 40. Each of conventional flail chains 30 is comprised of a plurality of identical interconnected links that are oval in shape, such as links 42, 44 and 46 shown in FIG. 2. Other conventional flail chains may be comprised of identical interconnected links 48, 50 and 52 that are circular in shape, as shown in FIG. 3. Each of these conventional chain links is made of heat-treated wire or rod material having a generally circular cross-section and a diameter of 0.50-0.75 inches or larger.

As is illustrated in FIGS. 2 and 3, the links of conventional flail chains interlock at a single contact point. Each of these drawings illustrates three identical interlocking links of a flail chain in the configuration that would result if the three interlocking links were part of a flail chain (such as for example, flail chain 30) that was being rotated about an axis of rotation (such as axle 26). Thus, as shown in FIG. 2, identical oval links 42, 44 and 46 are arranged as they would be if they were part of a flail chain being rotated about an axis of rotation that is intersected by first axis $FA_2$. The rotational force applied to the flail chain would cause links 42, 44 and 46 to assume the relative configuration shown in FIG. 2. Each of links 42, 44 and 46 is comprised of a plurality of adjoining link sections including a pair of oppositely disposed end link sections that engage with the end link sections of adjacent links. Link 44 is comprised of left end link section 44L (as viewed in FIG. 2), top link section 44T, right end link section 44R and bottom link section 44B. Left end link section 44L of link 44 engages with right end link section 42R of link 42, and right end link section 44R of link 44 engages with left end link section 46L of link 46.

Link 44 has a center point $CP_{44}$ that is located at the center of mass of link 44. First axis $FA_2$ of link 44 passes through center point $CP_{44}$ and through the center of left end link section 44L and the center of right end link section 44R. Second axis $SA_{44}$, which is perpendicular, in this case, to first axis $FA_2$, passes through center point $CP_{44}$ and through the center of top link section 44T and the center of bottom link section 44B. In the chain segment shown in FIG. 2, first axis $FA_2$ of link 44 intersects second axis $SA_{44}$ of link 44 at center point $CP_{44}$ at the center of mass of link 44. Furthermore, second axis $SA_2$ of link 44 is not coincident with first axis $FA_2$ so that the first axis and second axis $SA_2$ together define a central plane through the center of each link section of link 44, which central plane is parallel to the plane of the page on which FIG. 2 is displayed.

Links 42 and 46 have first axes that pass through their respective center points (not shown) which are coincident with first axis $FA_2$, but their second axes $SA_{42}$ and $SA_{46}$ which pass through their center points and are perpendicular to first axis $FA_2$ are also perpendicular to the plane of the page on which FIG. 2 is displayed. Radius $R_{44}$ is the radius of an internal surface of left end link section 44L of link 44, as measured in the central plane through link 44. In the example shown in FIG. 2, the radius of an internal surface of right end link section 44R of link 44, as measured in the central plane through link 44, would also be equal to $R_{44}$. Radius $R_{42}$ comprises the radius of an internal surface in right end link section 42R of link 42, as measured in a plane that is orthogonal to a central plane passing through the center of each link section of link 42. In this example, radius $R_{42}$ corresponds to the radius of the rod from which link 42 is formed. In other words, conventional links 42, 44 and 46 are formed from rod material having a circular cross section (such as is shown by radius $R_{42}$) which has been configured into an oval link having a pair of oppositely disposed, identical end link sections, each of which has an internal surface with a radius $R_{44}$ that is larger than the radius of the circular cross-section $R_{42}$. Since radius $R_{44}$ is larger than radius $R_{42}$, there is a single contact point between link 42 and link 44, and a single contact point between link 44 and link 46.

Similarly, as shown in FIG. 3, identical circular links 48, 50 and 52 are arranged as they would be if they were part of a flail chain being rotated about an axis of rotation that is intersected by first axis $FA_3$. The rotational force applied to the flail chain would cause links 48, 50 and 52 to assume the relative configuration shown in FIG. 3. Each of these links is comprised of a plurality of adjoining link sections including a pair of oppositely disposed end link sections that engage with the end link sections of adjacent links. Link 50 is comprised of left end link section 50L on the left side (as viewed in FIG. 3) of second axis $SA_{50}$ and right end link section 50R on the right side of second axis $SA_{50}$. Left end link section 50L of link 50 engages with right end link section 48R of link 48, and right end link section 50R of link 50 engages with left end link section 52L of link 52.

Link 50 has a center point $CP_{50}$ that is located at the center of mass of link 50. First axis $FA_3$ of link 50 passes through center point $CP_{50}$ and through the center of left end link section 50L and the center of right end link section 50R. Second axis $SA_{50}$, which is perpendicular, in this case, to first axis $FA_3$ passes through the center of the top link section (above first axis $FA_3$) and through the center of the bottom link section (below first axis $FA_3$). Thus, first axis $FA_3$ of link 50 intersects second axis $SA_{50}$ of link 50 at center point $CP_{50}$ at the center of mass of link 50. In link 50, first axis $FA_2$ is not coincident with second axis $SA_2$, so that first axis $FA_3$ and second axis $SA_3$ together define a central plane through the center of each link section of link 50, which central plane is parallel to the plane of the page on which FIG. 3 is displayed. Links 48 and 52 have first axes that pass through their respective center points (not shown) which are coincident with first axis $FA_3$, but their second axes $SA_{48}$ and $SA_{52}$ which pass through their center points are perpendicular to the plane of the page on which FIG. 3 is displayed. Radius $R_{50}$ is the radius of an internal surface of right end link section 50R of link 50, as measured in the central plane through link 50. In the example shown in FIG. 3, the radius of an internal surface of left end link section 50L of link 50, as measured in the central plane through link 50, would also be equal to $R_{50}$. Radius $R_{52}$ comprises the radius of an internal surface in left end link section 52L of link 52, as measured in a plane that is orthogonal to a central plane passing through the center of each link section of link 52. In this example, radius $R_{52}$ corresponds to the radius of the rod from which link 52 is formed. In other words, conventional links 48, 50 and 52 are formed from rod material having a circular cross section (such as is shown by radius $R_{52}$) which has been configured into a circular link having a pair of oppositely disposed, identical end link sections, each of which has an internal surface having a radius $R_{50}$ that is larger than the radius of the circular cross-section $R_{52}$. Since radius $R_{50}$ is larger than radius $R_{52}$, there is a single contact point between link 48 and link 50, and a single contact point between link 50 and link 52.

The inventors have found that flail chains comprised of conventional links which interlock at a single contact point experience wear due to the considerable movement of the links with respect to each other at their contact points during the flailing operation. In order to overcome this limitation, the inventors have devised an interlocking link configuration that expands the area of contact and limits the movement of the interlocking links with respect to each other. The inventors believe that this link configuration could provide up to 40% additional wear life over that of flail chains comprised of conventional links.

Furthermore, the inventors have found that links having edged or ridged outer surfaces generate more tractive force as the chain strikes the bark, which improves the transfer of energy used to loosen and remove the bark. In addition, flail assemblies including chains comprised of links according to a preferred embodiment of the invention are more efficient and can be operated at reduced speeds, thereby saving energy and reducing the maintenance required for long-term operation of the flail assembly.

ADVANTAGES OF A PREFERRED EMBODIMENT OF THE INVENTION

Among the advantages of a preferred embodiment of the invention is that it provides a flail chain that lasts longer than a conventional flail chain. In addition, a preferred embodiment of the invention provides a flail assembly and a method of flailing that is more efficient than conventional flail assemblies, and may be operated effectively at reduced speeds, when compared to conventional flail assemblies. A preferred embodiment of the invention also provides a flail assembly for a debarking machine that requires less energy for efficient operation and less maintenance for long-term operation. Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Terms concerning attachments, coupling and the like, such as "connected", "interconnected", "interlocking" and "attached", refer to a relationship wherein structures are secured or attached to one another either directly or indirectly through intervening structures, as well as both moveable and rigid attachments or relationships, unless otherwise specified herein or clearly indicated as having a different relationship by context. The terms "operatively connected" and "operatively attached" describe an attachment, coupling or connection that allows the pertinent structures to operate as intended by virtue of that relationship.

All methods described herein can be performed in any suitable order unless otherwise specified herein or clearly indicated by context.

Various terms are specifically defined herein. These terms are to be given their broadest reasonable construction consistent with such definitions, as follows:

The term "debarking machine" refers to a machine for removing bark and limbs from a log. A debarking machine may also include a log chipping component.

The term "flail assembly" refers to a flail shaft, which may comprise an axle, drum and bearings associated therewith, with flail chains operatively attached, that is a part of a debarking machine.

The term "processing direction" refers to the direction of travel of a log for processing through a flail assembly.

The term "flail shaft", when used in reference to a flail assembly, comprises a shaft, axle, disk and/or drum that is rotatable about an axis of rotation and to which one or more flail chains (as hereinafter defined) are operatively attached.

The term "flail chain" refers to a chain comprised of a plurality of interconnected links and having an attachment end and a free end. The attachment end of a flail chain is operatively attached to a flail shaft that is rotated so that at least a portion the flail chain can come into contact with a log in a debarking machine.

The terms "chain link" and "link" refer to the links that are interconnected to form a flail chain.

SUMMARY OF THE INVENTION

The invention comprises a flail chain comprising a plurality of interlocking flail chain links that may be employed in a flail assembly of a debarking machine, and a method for operating a flail assembly comprising a plurality of such flail chains. Each of the links in the flail chain comprises a plurality of adjoining link sections including a pair of oppositely disposed end link sections. Each of these end link sections has an internal surface that is adapted to engage an internal surface of an end link section of an adjacent link. Each link includes a center of mass which defines a center point, a first axis through the center point of the link and through the center of each end link section, and a second axis through the center point of the link and through the center of at least two link sections, which second axis is not coincident with the first axis. The first axis and the second axis together define a central plane through the center of each link section of the link. Each link includes an orthogonal plane that passes through each of the oppositely disposed end link sections and is perpendicular to the central plane. A radius of the internal surface of each end link section that is measured in the central plane is equal to a radius of the internal surface of such end link section that is measured in the orthogonal plane.

The preferred flail assembly includes a flail shaft that is mounted for rotation about an axis that is generally perpendicular to the processing direction in which logs are moved for debarking and generally parallel to the plane of the surface on which the debarking machine is placed. Attached to this flail shaft are a plurality of the flail chains comprising the flail chain links which are described herein, each of which has an attachment end that is operatively attached to the shaft, and a free end.

In order to facilitate an understanding of the invention, the preferred embodiment of the invention and the best mode known by the inventors for carrying out the invention are illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter described herein, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is intended to be encompassed within the scope of the invention, unless otherwise indicated herein or clearly excluded by context.

BRIEF DESCRIPTION OF THE DRAWINGS

FIG. 6 is a front view of the link shown in FIG. 5.

FIG. 7 is a sectional view of the link shown in FIG. 6, taken through line 7-7 of FIG. 6.

FIG. 8 is a sectional view of the link shown in FIG. 6, taken through line 8-8 of FIG. 6.

FIG. 9 is a bottom view of the link shown in FIG. 6.

FIG. 10 is a sectional view of the link shown in FIGS. 6 and 9, taken through line 10-10 of FIG. 9.

DESCRIPTION OF THE PREFERRED EMBODIMENT OF THE INVENTION

This description of the preferred embodiment of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

As shown in FIGS. 4 and 11-13, flail chain 54 is comprised of a plurality of essentially identical chain links 56. These drawings show flail chain 54 with its links 56 arranged as they would be if they were part of a flail chain being rotated about an axis of rotation that is intersected by axis $A_1$ of FIGS. 4 and 11. The rotational force applied to the flail chain would cause links 56 to assume the relative configuration shown in FIGS. 4, 11 and 13.

Each chain link 56 comprises a plurality of adjoining link sections and a center of mass which defines center point $CP_{56}$. Thus, link 56 has a left end link section 56L (as best shown in FIG. 6), left bottom transition link section 56LBT, bottom link section 56B, right bottom transition link section 56RBT, right end link section 56R, right top transition link section 56RTT, top link section 56T and left top transition link section 56LTT. Each link section of link 56 has a center of mass which defines the center of the link section.

As is clear from an examination of FIG. 6, left end link section 56L and right end link section 56R are oppositely disposed with respect to each other. Left end link section 56L has an internal surface 56LS and right end link section 56R has an internal surface 56RS. Link 56 has a first axis $FA_{56}$ through center point $CP_{56}$ and through the center of left end link section 56L and right end link section 56R. Link 56 also has a second axis $SA_{56}$ that passes through the center point of the link and through the center of at least two link sections, in this case through the center of top link section 56T and the center of bottom link section 56B. Second axis $SA_{56}$ is not coincident with first axis $FA_{56}$, so that the first axis and the second axis together define a central plane through the center of each link section of the link, which central plane is parallel to the plane of the page on which FIG. 6 is displayed. Link 56 also includes an orthogonal plane that passes through each of left end link section 56L and right end link section 56R and is perpendicular to the central plane. Thus, the orthogonal plane of link 56 is perpendicular to the plane of the page on which FIG. 6 is displayed. Preferably, as shown in FIGS. 6 and 8, the orthogonal plane of link 56 includes first axis $FA_{56}$ through center point $CP_{56}$ of the link and passes through the center of each of left end link section 56L and right end link section 56R.

Figures 12, 13:
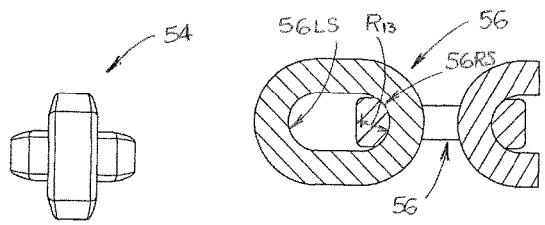
FIG. 12 is an end view of the flail chain shown in FIG. 11.
FIG. 13 is a sectional view of a portion of the flail chain shown in FIG. 11, taken through line 13-13 of FIG. 11.

As shown by comparing FIGS. 6, 8 and 10, radius $R_C$ of internal surface 56LS of left end link section 56L that is measured in the central plane, as shown in FIG. 10, is equal to radius $R_O$ of the internal surface of right end link section 56R that is measured in a plane that is orthogonal to the central plane, as shown in FIG. 8. In this embodiment of the invention, radius $R_C$ is also the radius of internal surface 56RS on right end link section 56R that is measured in the central plane. As shown in FIG. 13, radius $R_{13}$, the radius of internal surface 56RS on the right end link section (corresponding to right end link section 56R shown in FIGS. 5 and 6) that is measured in the central plane is also equal to the radius of internal surface 56LS on the left end link section (corresponding to left end link section 56L shown in FIGS. 5 and 6) that is measured in the central plane, and is also equal to the radius of the internal surface of (left) end link section 56 (shown in cross-section) that is measured in a plane that is orthogonal to the central plane.

It is preferred that each of the oppositely disposed end link sections 56L and 56R has an identical end link mass, and that the plurality of adjoining link sections includes a first intermediate link section such as top link section 56T and a second intermediate link section such as bottom link section 56B, and that each of these intermediate link sections has a mass that is less than the end link mass. This can be observed by viewing FIG. 9 and considering the density of each link section of link 56 to be equal.

It is also preferred, as shown in FIG. 9, that each of the oppositely disposed end link sections 56L and 56R has an end link width $W_E$, and that the plurality of adjoining link sections includes a first intermediate link section such as top link section 56T and a second intermediate link section such as bottom link section 56B, each of which has a width $W_1$ that is less than the end link width $W_E$. It is also preferred, as shown by comparing FIGS. 6 and 9, that the transition link sections of link 56, namely left bottom transition link section 56LBT, right bottom transition link section 56RBT, right top transition link section 56RTT and left top transition link section 56LTT have widths that vary so as to transition the width of link 56 from the end link width $W_E$ of the left end link section 56L and right end link section 56R to the intermediate link width $W_1$ of top link section 56T and bottom link section 56B.

Figure 5:
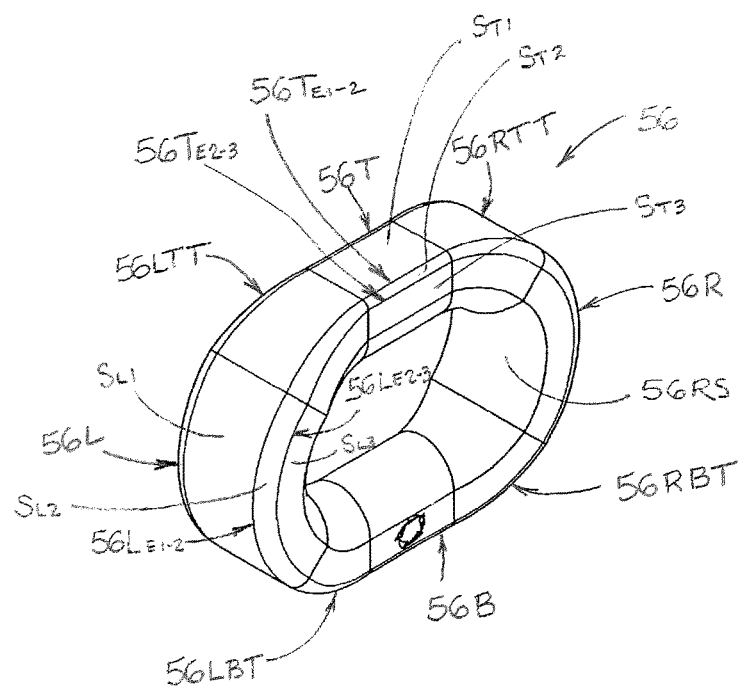
FIG. 5 is a perspective view of a link of the flail chain shown in FIG. 4.
Figure 11:
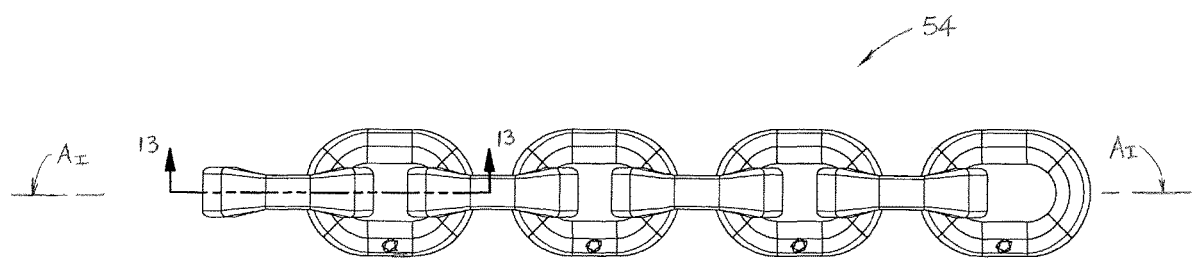
FIG. 11 is a front view of the flail chain shown in FIG. 4.

It is also preferred, as shown in FIG. 5, that link 56 include an outer surface comprising a plurality of outer edges that are defined by a pair of intersecting surfaces. Thus, for example, left end link section 56L has an outer surface comprising a plurality of outer edges, including edge $56L_{E1-2}$ and $56L_{E2-3}$. Each of these edges are defined by a pair of intersecting surfaces. Thus, for example, left end link section 56L includes edge $56L_{E1-2}$ that is defined by the intersection of surface $S_{L1}$ and surface $S_{L2}$. Similarly, edge $56L_{E2-3}$ is defined by the intersection of surface $S_{L2}$ and surface $S_{L3}$. In the same manner, top link section 56T includes edge $56T_{E1-2}$ that is defined by the intersection of surface $S_{T1}$ and surface $S_{T2}$, and edge $56T_{E2-3}$ which is defined by the intersection of surface $S_{T2}$ and surface $S_{T3}$.

Figure 1:
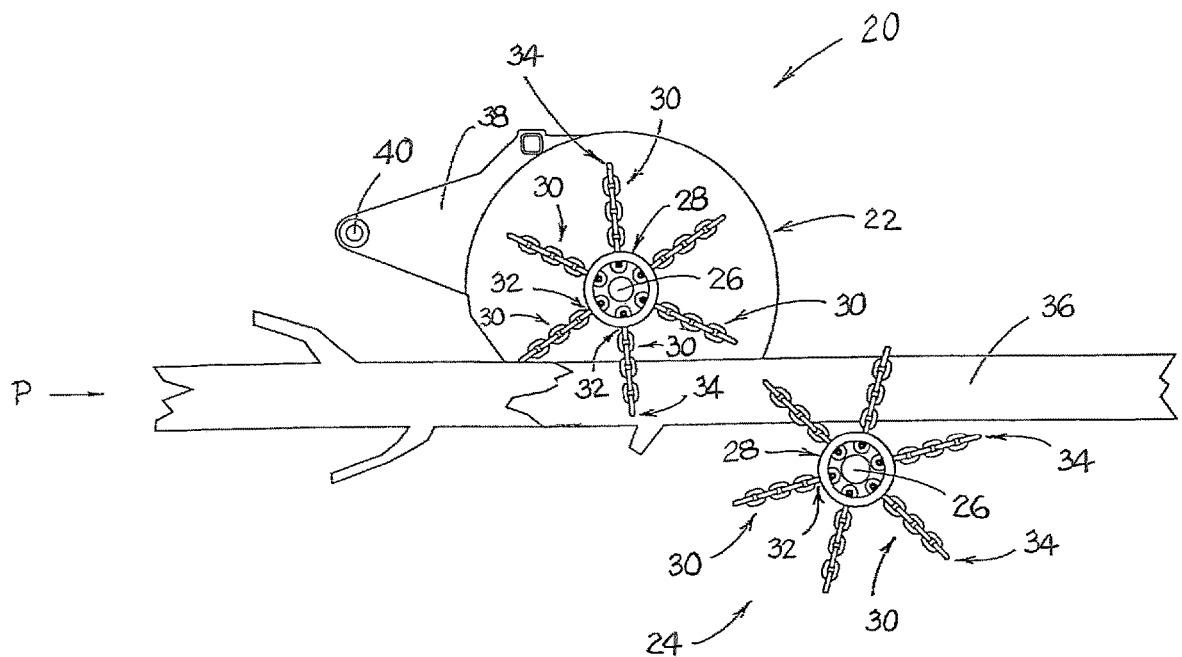
FIG. 1 is a side view of a portion of a conventional debarking machine which includes an upper flail assembly and a lower flail assembly.
Figure 2:
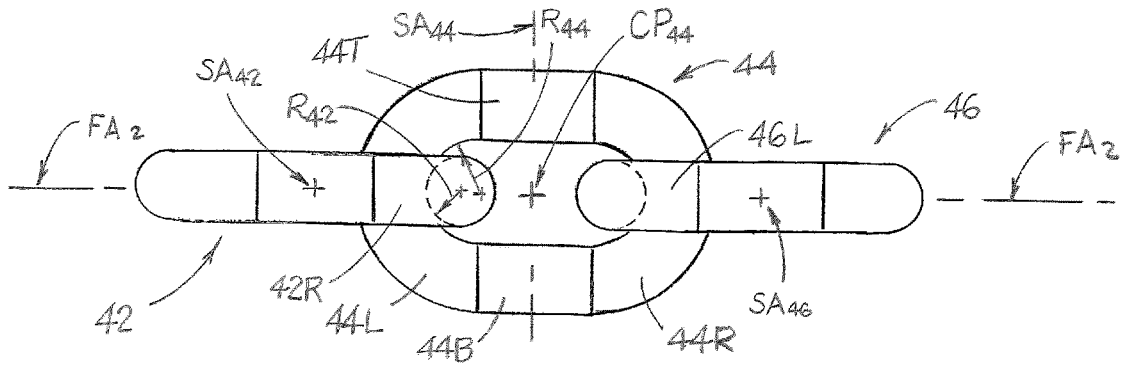
FIG. 2 is a front view of a portion of a conventional flail chain comprised of a plurality of interconnected links that are oval in shape and have a generally circular link cross-section.
Figure 3:
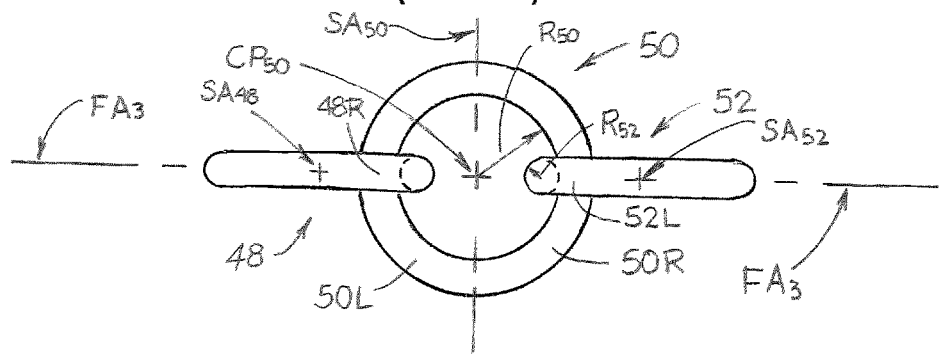
FIG. 3 is a front view of a portion of a conventional flail chain comprised of a plurality of interconnected links that are circular in shape and have a generally circular link cross-section.
Figure 4:
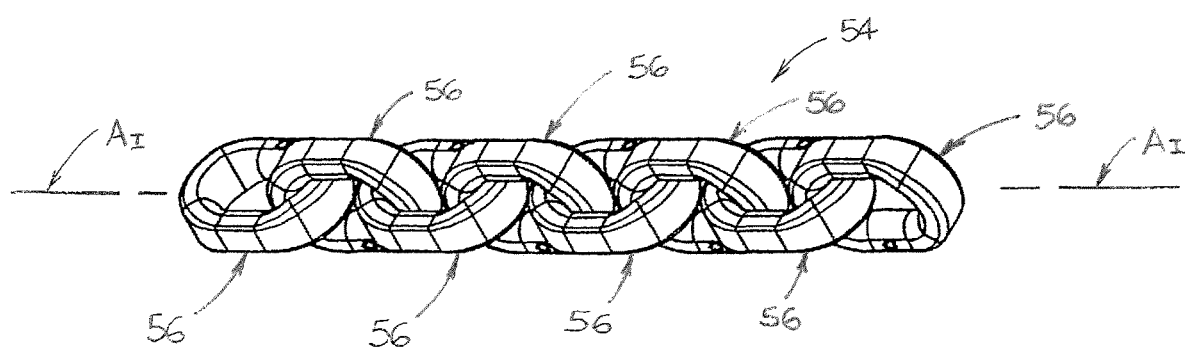
FIG. 4 is a perspective view of a portion of a flail chain comprised of links configured according to a preferred embodiment of the invention.

The flail chains of the invention are adapted to be employed in the flail assembly of a debarking machine that is adapted to process a log such as log 22 shown in FIG. 1, as the log is carried through the machine in processing direction P. Each of the flail assemblies includes a flail shaft to which are operatively attached a plurality of flail chains, the links of which comprise links 56. As is described above, each of these links 56 comprises a plurality of adjoining link sections including a pair of oppositely disposed end link sections. Each of the end link sections has an internal surface that is adapted to engage an internal surface of an end link section of an adjacent link. Furthermore, each link 56 includes a center of mass which defines a center point, and a first axis through the center point of the link and through the center of each end link section. Each link 56 also includes a second axis through the center point of the link and through the center of at least two link sections, and this second axis is not coincident with the first axis, so that the first axis and the second axis together define a central plane through the center of each link section of the link. Each link 56 includes an orthogonal plane that passes through each of the oppositely disposed end link sections and is perpendicular to the central plane. A radius of the internal surface of each end link section that is measured in the central plane is equal to a radius of the internal surface of such end link section that is measured in the orthogonal plane.

Each flail shaft of a flail assembly is driven by a motor or other known means so as to rotate about a flail axis of rotation that is perpendicular to the plane of the page of FIG. 1. Such flail axis of rotation is generally perpendicular to the processing direction and generally parallel to the surface on which the debarking machine is placed for operation. Each flail chain has an attachment end that is attached to the flail shaft, and a free end. Rotation of the flail shafts causes the flail chains to contact the bark on the log as it is moved in processing direction P, and thereby to flail the bark and limbs from the log.

Each of the preferred links 56 in a flail chain has an enlarged area of contact with adjacent links, which limits the movement of the interlocking links with respect to each other and reduces the rate of wear of the links caused by link interaction. In addition, flail chains comprised of links 56, each of which has an outer surface comprising a plurality of outer edges, generate more tractive force as the chain strikes the bark, which improves the transfer of energy used to loosen and remove the bark. Furthermore, flail assemblies including chains comprised of links 56 are more efficient and can be operated at reduced speeds, thereby saving energy and reducing the maintenance required for long-term operation of the flail assembly.

Although this description contains many specifics, these should not be construed as limiting the scope of the invention but as merely providing illustrations of the presently preferred embodiments thereof, as well as the best mode contemplated by the inventors of carrying out the invention. The invention, as described herein, is susceptible to various modifications and adaptations, as would be understood by those having ordinary skill in the art to which the invention relates.

What is claimed is:

1. A flail chain comprising a plurality of interconnected links, each of which links:
    (A) comprises a plurality of adjoining link sections including a pair of oppositely disposed end link sections, each of which end link sections has an internal surface that is adapted to engage an internal surface of an end link section of an adjacent link;
    (B) includes a center of mass which defines a center point;
    (C) includes a first axis through the center point of the link and through the center of each end link section;
    (D) includes a second axis through the center point of the link and through the center of at least two link sections, which second axis is not coincident with the first axis, so that said first axis and said second axis together define a central plane through the center of each link section of the link;
    (E) includes an orthogonal plane that passes through each of the oppositely disposed end link sections and is perpendicular to the central plane;
    (F) wherein a radius of the internal surface of each end link section that is measured in the central plane is equal to a radius of the internal surface of such end link section that is measured in the orthogonal plane.

2. The flail chain of claim 1 wherein the orthogonal plane of each of the links includes the first axis through the center point of the link and through the center of each end link section.

3. The flail chain of claim 1 wherein:
    (A) each of the oppositely disposed end link sections of each link has an identical end link mass;
    (B) the plurality of adjoining link sections of each link includes a first intermediate link and a second intermediate link, each of which has a mass that is less than the end link mass.

4. The flail chain of claim 1 wherein:
    (A) each of the oppositely disposed end link sections of each link has an identical end link width;
    (B) the plurality of adjoining link sections of each link includes a first intermediate link and a second intermediate link, each of which has a width that is less than the end link width.

5. The flail chain of claim 1 wherein each link comprises:
    (A) a left end link section having a left end link width;
    (B) a right end link section having a right end link width that is equal to the left end link width;
    (C) a top link section having a top link width that is less than the left end link width;
    (D) a bottom link section having a bottom link width that is equal to the top link width.

6. The flail chain of claim 5 wherein each link further comprises:
    (A) a left bottom transition section between the left end link section and the bottom link section, said left bottom transition section having a width that varies so as to transition the width of the link from the left end link width to the bottom link width;
    (B) a right bottom transition section between the right end link section and the bottom link section, said right bottom transition section having a width that varies so as to transition the width of the link from the right end link width to the bottom link width;
    (C) a left top transition section between the left end link section and the top link section, said left top transition section having a width that varies so as to transition the width of the link from the left end link width to the top link width;
    (D) a right top transition section between the right end link section and the top link section, said right top transition section having a width that varies so as to transition the width of the link from the right end link width to the top link width.

7. The flail chain of claim 1 wherein each link further comprises an outer surface having a plurality of outer edges.

8. The flail chain of claim 7 wherein each of the plurality of outer edges on the outer surface of each link is defined by a pair of intersecting surfaces.

9. A method for removing bark from a log, said method comprising:
    (A) providing a flail assembly comprising:
        (1) a flail shaft that is adapted to be rotated about a flail axis of rotation;
        (2) a flail chain comprising:
            (1) an attachment end that is attached to the flail shaft;
            (2) a free end;
            (3) a plurality of interconnected links, each of which:
                (a) comprises a plurality of adjoining link sections including a pair of oppositely disposed end link sections, each of which end link sections has an internal surface that is adapted to engage an internal surface of an end link section of an adjacent link;
                (b) includes a center of mass which defines a center point;
                (c) includes a first axis through the center point of the link and through the center of each end link section;
                (d) includes a second axis through the center point of the link and through the center of at least two link sections, which second axis is not coincident with the first axis, so that said first axis and said second axis together define a central plane through the center of each link section of the link;
                (e) includes an orthogonal plane that passes through each of the oppositely disposed end link sections and is perpendicular to the central plane;
            wherein a radius of the internal surface of each end link section that is measured in the central plane is equal to a radius of the internal surface of such end link section that is measured in the orthogonal plane;
    (B) moving the log in a processing direction that is generally perpendicular to the flail shaft axis so that rotation of the flail shaft will cause the flail chains to contact the log.

* * * * *

UNITED STATES PATENT AND TRADEMARK OFFICE
CERTIFICATE OF CORRECTION

PATENT NO. : 11,045,972 B2  
APPLICATION NO. : 16/380118  
DATED : June 29, 2021  
INVENTOR(S) : Nathan Anderson et al.

Page 1 of 1

It is certified that error appears in the above-identified patent and that said Letters Patent is hereby corrected as shown below:

On the Title Page

Item (73) Column 1, change "Astee, Inc." to --Astec, Inc.--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*